(12) United States Patent
Gold

(10) Patent No.: US 10,846,592 B2
(45) Date of Patent: Nov. 24, 2020

(54) ORGANIC LEARNING

(71) Applicant: Carl Steven Gold, Albany, CA (US)

(72) Inventor: Carl Steven Gold, Albany, CA (US)

(*) Notice: Subject to any disclaimer, the term of this patent is extended or adjusted under 35 U.S.C. 154(b) by 726 days.

(21) Appl. No.: 15/672,445

(22) Filed: Aug. 9, 2017

(65) Prior Publication Data
US 2019/0050722 A1 Feb. 14, 2019

(51) Int. Cl.
G06N 3/08 (2006.01)
G06N 20/00 (2019.01)
G06N 3/04 (2006.01)

(52) U.S. Cl.
CPC ............ G06N 3/08 (2013.01); G06N 3/049 (2013.01); G06N 20/00 (2019.01); G06N 3/04 (2013.01)

(58) Field of Classification Search
USPC .......................................................... 706/25
See application file for complete search history.

(56) References Cited

U.S. PATENT DOCUMENTS

| | | | |
|---|---|---|---|
| 7,236,831 B2 * | 6/2007 | Firlik | A61N 1/36025 607/45 |
| 7,805,386 B2 * | 9/2010 | Greer | G06N 3/04 706/12 |
| 7,882,052 B2 * | 2/2011 | Szathmary | G06N 3/086 706/27 |
| 9,095,303 B2 * | 8/2015 | Osorio | A61N 1/36139 |
| 9,458,157 B2 * | 10/2016 | Okano | A61P 25/16 |
| 9,753,959 B2 * | 9/2017 | Birdwell | G06N 3/049 |
| 9,855,442 B2 * | 1/2018 | Deisseroth | A61N 5/062 |
| 9,925,695 B2 * | 3/2018 | Liu | A61L 27/58 |
| 9,962,468 B2 * | 5/2018 | Sabri | C12M 35/08 |
| 2010/0235310 A1 * | 9/2010 | Gage | G06N 3/082 706/14 |
| 2019/0080207 A1 * | 3/2019 | Chang | G06K 9/723 |

* cited by examiner

Primary Examiner — Michael B Holmes
(74) Attorney, Agent, or Firm — Gaia Intellectual Properties, LLC

(57) ABSTRACT

Certain aspects of the present disclosure provide systems and methods for configuring and training neural networks. The method includes models of individual neurons in a network that avoid certain biologically impossible or implausible features of conventional artificial neural networks. Exemplary networks may use patterns of local connections between excitatory and inhibitory neurons to provide desirable computational properties. A network configured in this manner is shown to solve a digit classification problem.

20 Claims, 16 Drawing Sheets

| Layer | Description | Excite or Inhibit ? | # types | # neurons | X range | Y range |
|---|---|---|---|---|---|---|
| 1 | Input | E/I | 2 | 384 | 0-11 | 0-15 |
| 2 | Simple Features | E | 8 | 1536 | 0-11 | 0-15 |
| 3 | Complex Features | E/I | 56 | 4303 | 2-9 | 2-13 |
| 4 | Output | E | 5 | 680 | 2-9 | 2-13 |

FIGURE 3

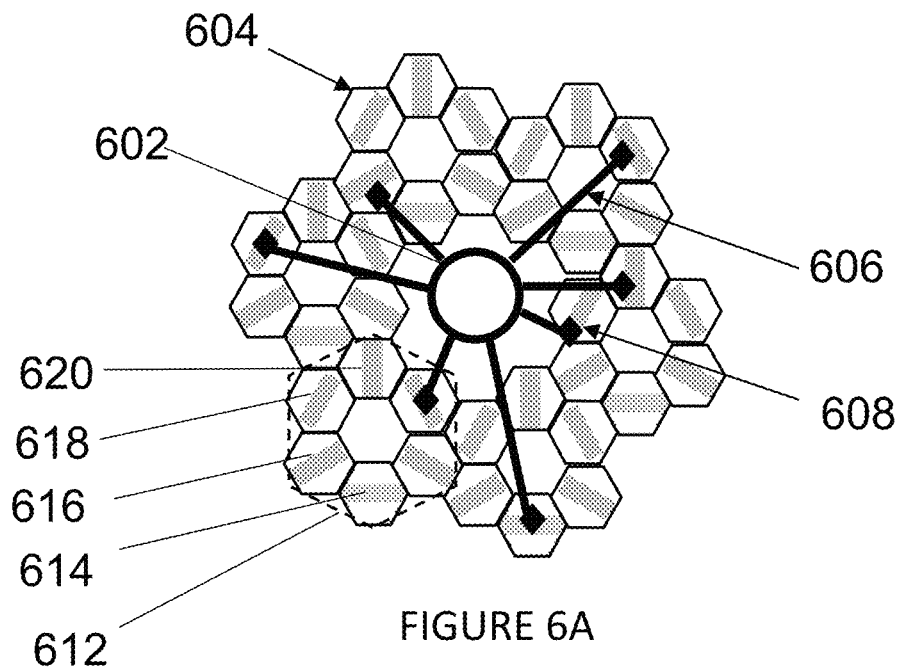
FIGURE 6A
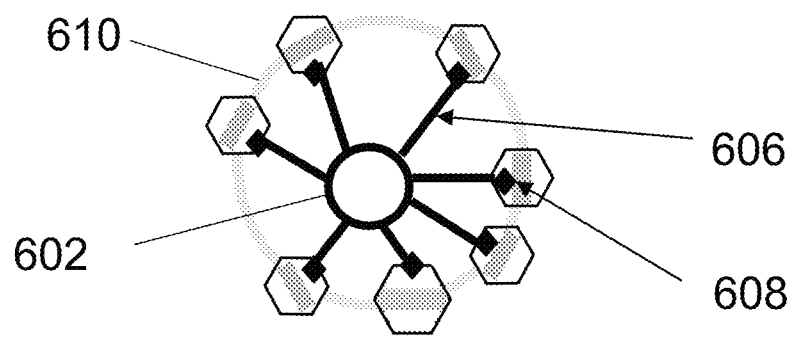
FIGURE 6B
| .000 | .000 | .000 | .000 | .000 | .000 | .000 | .000 | .000 | .000 |
|---|---|---|---|---|---|---|---|---|---|
| .000 | -.002 | -.006 | -.004 | -.002 | -.001 | -.003 | -.003 | -.003 | .000 |
| -.003 | -.004 | .003 | .008 | .007 | .004 | .006 | .003 | -.005 | -.002 |
| -.006 | .003 | .011 | .007 | .003 | -.001 | .005 | .010 | -.001 | -.004 |
| -.006 | .008 | .009 | -.011 | -.012 | -.013 | -.006 | .013 | .006 | -.006 |
| -.006 | .009 | .009 | -.012 | -.006 | -.005 | -.012 | .009 | .010 | -.006 |
| -.006 | .006 | .013 | -.006 | -.013 | -.012 | -.011 | .009 | .007 | -.006 |
| -.004 | -.001 | .010 | .006 | -.001 | .003 | .007 | .011 | .003 | -.005 |
| -.002 | -.005 | .002 | .006 | .005 | .007 | .007 | .003 | -.004 | -.003 |
| .000 | -.002 | -.004 | -.003 | -.001 | -.002 | -.004 | -.006 | -.002 | .000 |
| .000 | .000 | .000 | .000 | .000 | .000 | .000 | .000 | .000 | .000 |
FIGURE 6C

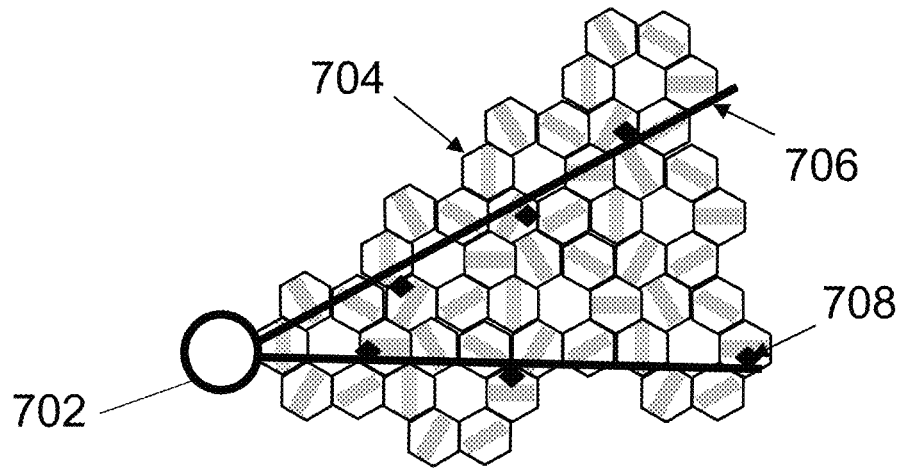
FIGURE 7A
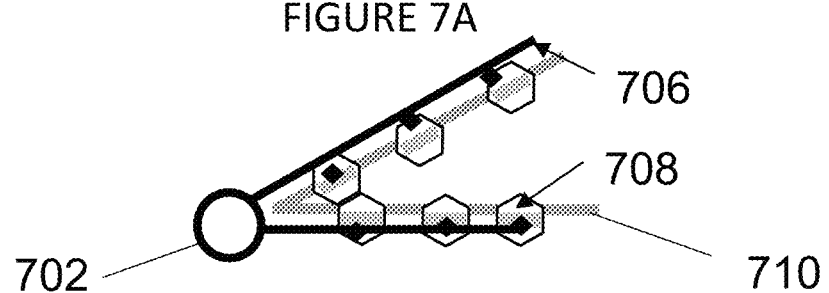
FIGURE 7B
| .000 | .000 | .000 | .000 | .000 | -.007 | -.004 | -.001 | .002 |
|---|---|---|---|---|---|---|---|---|
| .000 | .000 | .000 | .000 | -.007 | -.008 | .006 | .010 | -.001 |
| .000 | .000 | .000 | -.007 | -.008 | .005 | .016 | .006 | -.004 |
| .000 | .000 | -.007 | -.008 | .006 | .018 | .005 | -.007 | -.007 |
| .000 | -.007 | -.008 | .005 | .018 | .006 | -.008 | -.007 | .000 |
| -.008 | -.013 | -.005 | .005 | -.008 | -.020 | -.016 | -.005 | .000 |
| -.003 | .010 | .024 | .018 | .005 | .006 | .011 | .006 | .002 |
| .000 | .013 | .015 | .004 | .006 | .013 | .011 | .007 | .002 |
| .001 | -.003 | -.011 | -.018 | -.013 | -.013 | -.013 | -.008 | -.003 |
| .000 | .000 | .000 | .000 | .000 | .000 | .000 | .000 | .000 |
FIGURE 7C

| Connection Pattern Description | # Orientations | # of Neurons | Firing Rate on digits 0-9 |
|---|---|---|---|
| 2-line corner at 45° | 4 | 288 | 0.90% |
| 2-line corner at 70° | 4 | 320 | 0.80% |
| 2-line corner at 90°: "L" | 4 | 308 | 2.60% |
| 2-line corner at 135° | 8 | 352 | 5.50% |
| 2 lines at 180°: Long line | 6 | 96 | 4.80% |
| 3-line corner: 90° "T" | 4 | 384 | 1.60% |
| 4-line corner: 90° "+" | 1 | 96 | 2.50% |
| Small circle: as in 8/6/9 | 1 | 24 | 5.00% |
| Small half circle: as in 2/3 | 4 | 96 | 3.80% |
| Large half circle: as in 0 | 2 | 18 | 10.00% |
| TOTAL | 38 | 1982 | 2.20% |

FIGURE 11

X position

| | 2 | 3 | 4 | 5 | 6 | 7 | 8 | 9 |
|---|---|---|---|---|---|---|---|---|
| 2 | 14 | 25 | 25 | 25 | 25 | 25 | 25 | 21 |
| 3 | 23 | 34 | 50 | 50 | 50 | 50 | 34 | 30 |
| 4 | 23 | 34 | 50 | 50 | 50 | 50 | 34 | 30 |
| 5 | 23 | 46 | 62 | 74 | 74 | 74 | 46 | 30 |
| 6 | 23 | 46 | 62 | 74 | 74 | 74 | 46 | 30 |
| 7 | 23 | 46 | 62 | 74 | 74 | 74 | 46 | 30 |
| 8 | 23 | 46 | 62 | 72 | 72 | 72 | 46 | 30 |
| 9 | 23 | 46 | 62 | 74 | 74 | 74 | 46 | 30 |
| 10 | 23 | 46 | 62 | 74 | 74 | 74 | 46 | 30 |
| 11 | 23 | 34 | 50 | 62 | 62 | 62 | 34 | 30 |
| 12 | 23 | 34 | 50 | 60 | 60 | 60 | 34 | 30 |
| 13 | 14 | 18 | 34 | 34 | 34 | 34 | 18 | 14 |

Y position 1202  1204  1206  1208

FIGURE 12

| Digit | Avg. # Firing | Distractor (Figure #) | Avg. # Firing |
|---|---|---|---|
| 1 | 13.2 | 1320 | 2.1 |
| 7 | 12.9 | 1302 | 1.2 |
| 5 | 12.6 | 1312 | 0.25 |
| 0 | 11.5 | 1316 | 0.13 |
| 3 | 6.8 | 1306 | 0.10 |
| 8 | 6.8 | 1304 | 0 |
| 9 | 5.4 | 1308 | 0 |
| 4 | 5.2 | 1310 | 0 |
| 6 | 4.5 | 1314 | 0 |
| 2 | 4.3 | 1318 | 0 |

FIGURE 14

ORGANIC LEARNING

BACKGROUND

Field

Certain aspects of the present disclosure generally relate to neural system engineering, and more particularly to systems and methods for configuring and/or training neural networks for classification.

Background

The last several years have seen significant advances in the application of artificial neural networks to machine learning problems. Examples include the application of neural networks to visual classification tasks, auditory classification tasks, and the like, for which artificial neural networks have achieved state-of-the-art performance. In the view of many neuroscientists, however, this progress has not translated into increased understanding of biological intelligence. In addition, principles of biological neural networks have not informed the design of artificial neural networks in many respects.

To the extent that conventional artificial neural networks ignore or even contradict certain principles of biological neural network structure and function, progress towards achieving certain aspects of biological intelligence may be hampered. Accordingly, certain aspects of the present disclosure are directed to configuring and training neural networks that may be reconciled with the structure and function of biological neural networks.

SUMMARY

Certain aspects of the present disclosure generally relate to providing, implementing, and using a method of configuring neural networks. According to certain aspects, a visual data classification network may be configured such that much of the training typically associated with neural network design may be avoided.

Certain aspects of the present disclosure provide a system for configuring a neural network. The system generally includes a memory and a processor coupled to the memory. The processor is configured to: arrange a first plurality of neurons in a topography, wherein a selectivity of a first neuron of the first plurality is based at least in part on a position of the first neuron in the topography; arrange a second plurality of neurons in the topography; wherein a second neuron of the plurality of neurons includes a body and a dendrite, the body having a position in the topography and the dendrite extending from the body and having an orientation in the topography. The processor is further configured to: connect the first neuron to the second neuron, so that an output of the first neuron is an input to the second neuron, based at least in part on: the position of the first neuron; the orientation of the dendrite at the position of the first neuron; and the selectivity of the first neuron.

Certain aspects of the present disclosure provide a non-transitory computer readable medium having instructions stored thereon. The instructions, upon execution by a computing device, cause the computing device to perform operations comprising: arranging a first plurality of neurons in a topography, wherein a selectivity of a first neuron of the first plurality is based at least in part on a position of the first neuron in the topography; arranging a second plurality of neurons in the topography; wherein a second neuron of the plurality of neurons includes a body and a dendrite, the body having a position in the topography and the dendrite extending from the body and having an orientation in the topography. The instructions, upon execution by a computing device, cause the computing device to perform operations further comprising: connecting the first neuron to the second neuron, so that an output of the first neuron is an input to the second neuron, based at least in part on: the position of the first neuron; the orientation of the dendrite at the position of the first neuron; and the selectivity of the first neuron.

Certain aspects of the present disclosure provide a method for configuring a neural network. The method generally includes: arranging a first plurality of neurons in a topography, wherein a selectivity of a first neuron of the first plurality is based at least in part on a position of the first neuron in the topography; arranging a second plurality of neurons in the topography; wherein a second neuron of the plurality of neurons includes a body and a dendrite, the body having a position in the topography and the dendrite extending from the body and having an orientation in the topography. The method further includes connecting the first neuron to the second neuron, so that an output of the first neuron is an input to the second neuron, based at least in part on: the position of the first neuron; the orientation of the dendrite at the position of the first neuron; and the selectivity of the first neuron.

BRIEF DESCRIPTION OF DRAWINGS

FIG. 3 illustrates a network summary in accordance with certain aspects of the present disclosure.

FIG. 6A illustrates a neuron with star-shaped dendrites having connections to line-detector neurons that are responsive to orientations substantially perpendicular to the dendrite orientation in accordance with certain aspects of the present disclosure.

FIG. 6B illustrates a neuron that is responsive to the presence of a circular path in its receptive field in accordance with certain aspects of the present disclosure.

FIG. 6C illustrates a receptive field of a neuron in accordance with certain aspects of the present disclosure.

FIG. 7A illustrates a neuron having connections to line-detector neurons that are responsive to orientations substantially parallel to the dendrite orientation in accordance with certain aspects of the present disclosure.

FIG. 7B illustrates a neuron that is responsive to the presence of a corner in its receptive field, with the locus at the position of the neuron body in accordance with certain aspects of the present disclosure.

FIG. 7C illustrates a receptive field of a neuron in accordance with certain aspects of the present disclosure.

FIG. 11 illustrates a summary of neurons responsivity types in a neural network in accordance with certain aspects of the present disclosure.

FIG. 12 illustrates a number of neurons by position in a layer in accordance with certain aspects of the present disclosure.

FIG. 14 illustrates example results for an untrained neural network in accordance with certain aspects of the present disclosure.

DETAILED DESCRIPTION

Figure 1:
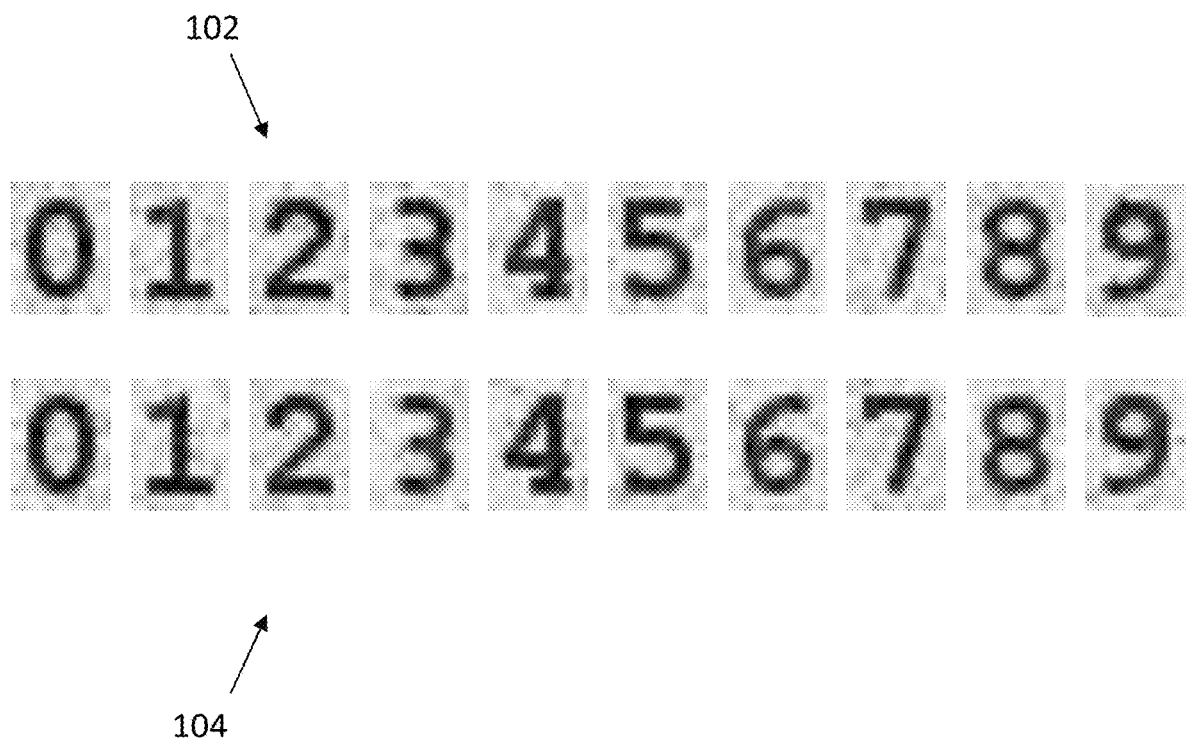
FIG. 1 illustrates example digits with added Poisson noise in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Biological Impossibility or Implausibility in Conventional Neural Networks

Several common characteristics of conventional artificial neural networks may be biologically impossible or implausible. Impossible or implausible elements of conventional neural networks include non-neuron units, weight inconsistency, non-local connectivity, overly informed learning, and random initialization.

Non-neuron units may refer to putative single "neurons" that do not output a binary spike. This includes smoothed approximations of a step function, such as a hyperbolic tangent (tanh) function, as well as functional forms derived from signal processing theory. A binary step function may be a biologically possible model for a neuron under certain assumptions, as discussed below.

Weight inconsistency may refer to a property of conventional artificial neural networks by which synapses may change sign during training. Putative neurons may not have a uniform effect, either excitatory or inhibitory, on all downstream connections. According to Dale's Principle, however, downstream synapses of a single neuron may be constrained to have the same blend of neurotransmitters. For example, GABA and Glutamate may not mix within the same cell. Therefore, mixed excitatory/inhibitory downstream synapses or sign changes on individual synapses may not be biologically possible.

Non-local connectivity may refer to neural network models that contain connections between layers that do not reflect proximity constraints. For example, fully connected network layers may not reflect proximity constraints. Biological neural connections may be constrained to a certain physical range. This physical range may correspond to local regions in the space of information being processed.

Overly informed learning may refer to neural network learning rules that rely on mechanisms that may be biologically impossible or implausible. Such mechanisms may include backwards, direct, and/or real valued information transfer between neurons and synapses.

Random initialization may refer to neural networks for which model network weights are initialized to a completely random state. As such, the network may not compute a meaningful response before training. Biological neural networks created in such a state may not support an organism's ability to survive and learn. This form of biological impossibility or implausibility may correspond to a low likelihood of a certain feature of biological neural networks that are subject to competitive evolutionary pressures.

Organic Learning

Aspects of the present disclosure avoid many or all of the biologically impossible or implausible approaches or techniques described above. In addition, a neural network configured and/or trained in accordance with certain aspects of the present disclosure may include one or more biologically possible characteristics, as described below. As such, a neural network embodiment of certain aspects of the present disclosure may be referred to as a biologically possible neural network. Systems and methods in accordance with certain aspects of the present disclosure may also be referred to as Organic Learning systems and methods. Biologically possible characteristics may enable a neural network to solve a classification problem.

In one example, the neurons in a biologically possible neural network may make structured local patterns of connections between layers. Structured connections may imbue the network with built-in computational functionality before training.

In a second example, a neural network may be configured with alternating layers. A first layer in the alternating pattern may include mixed populations of excitatory and inhibitory neurons. A second layer in the alternating pattern may include only neurons that are excitatory.

In a third example, neurons that are directly responsible for output may follow a learning rule based on their output. In some embodiments, the learning rule may act upon the group of output neurons, as described below. Interior (hidden layer) neurons may learn according to a reinforcement rule. In some embodiments, interior (hidden layer) neurons may not learn at all.

In addition, a biologically possible neural network may be configured such that mechanisms can be scaled down to simpler forms and still function. In addition, mechanisms may be configured so that they may be scaled up to larger more complex networks. Scaling characteristics may reflect the evolution of nervous systems from simpler to more complex forms, having useful properties at each evolutionary stage.

The following sections provide an example of how a biologically possible neural network may be configured. Each layer of a neural network is described from input to output, along with details of a specific implementation concerning the classification of visual or auditory data. An exemplary neural network applied to visual data may classify digits.

Examples of digit visual data is illustrated in FIG. 1. The digits are black and white anti-aliased digits on a 12×16 pixel frame. Poisson noise is added to every presentation of the sample set. A first sample 102 and a second sample 104 are illustrated. In one embodiment, no two presentations or a digit are exactly the same.

Artificial Neurons

In one embodiment, artificial neurons in a biologically possible neural network may follow a simple step function. When the excitation (weighted sum of inputs) is below a configured threshold the output is zero. When the excitation is above the threshold the output is either one or negative one, depending on whether the neuron is excitatory or inhibitory.

In one embodiment, the threshold may be a fixed constant for all neurons, not an adjustable learning parameter. A fixed threshold may more closely reflect the function of biological neurons. While firing thresholds of real neurons may be modulated, effects that modulate the response threshold of biological neurons may not reflect long term learning. Because the threshold is fixed in the exemplary network, the weights of synapses may be described in units of the threshold. These dynamics may be summarized in Equation 1:

$$e_j = \sum_i w_i o_i \;\; w_i > 0,$$

In Equation 1, "e" is the excitation given by the weighted sum of the inputs. The weight of the input from neuron "i" to neuron "j" is denoted "$w_i$". Inputs to a neuron are the outputs, "o", of neurons that connect to the neuron. The input from neuron "i" to neuron "j" is denoted "$o_i$". Inputs can be positive or negative. Weights are constrained to be positive.

The output of a neuron can be summarized by Equation 2:

$$o_j = s_j H(e_j - t) \;\; s_i \Sigma[-1,1]$$

The output, "o", is given by the sign, "s", of each neuron. The output of neuron "j" is denoted "$o_j$". The neuron fires whenever the excitation is above a threshold, "t", given by the Heaviside step function "H".

Figure 2A:
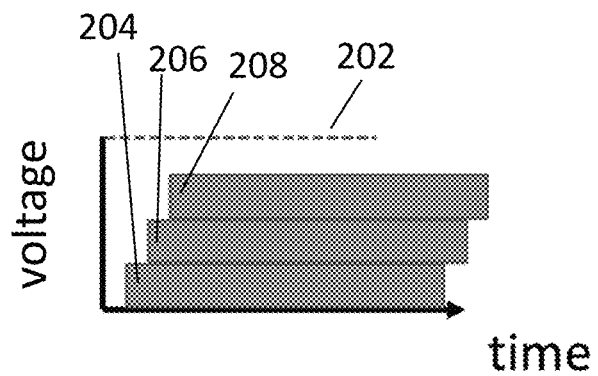
FIG. 2A illustrates post-synaptic potentials using a step function in accordance with certain aspects of the present disclosure.
Figure 2B:
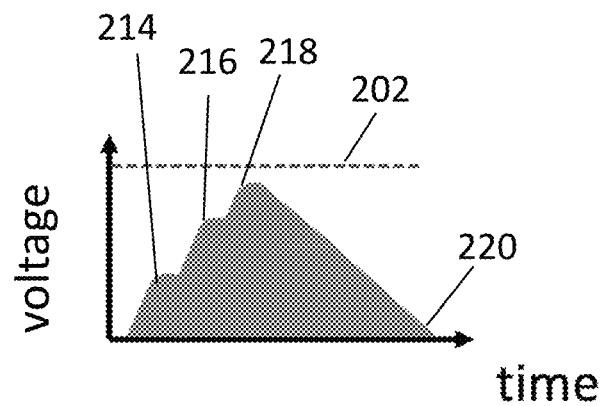
FIG. 2B illustrates post-synaptic potentials using a rise and decay time in accordance with certain aspects of the present disclosure.

Artificial neurons that include time-dependent post-synaptic potentials may be referred to as "spiking" neurons. FIGS. 2A-B illustrate an embodiment of certain aspects of the present disclosure that includes a simulation of spiking neurons. As illustrated in FIG. 2A, a binary output neuron may include a step function model of the Post-Synaptic Potential (PSP). With a step function PSP, the precise time at which the input spikes arrive may not matter as the receiving neuron, and therefore the network, may reach the same final state irrespective of a small jitter in time. In this example, three inputs arrived at the neuron, with the first contributing a first step 204 in the PSP. This was followed by a second step 206 corresponding to the arrival of a second input spike, and a third step 208 corresponding to a third input spike. In this example, the three input spikes were similarly weighted. Collectively the three input spikes did not increase the PSP enough to cross the threshold 202. Since the fourth spike did not arrive before the steps down at the end of the PSP, this output neuron did not emit a spike in this time interval. Because the ordering of spikes may not matter in a model of PSPs using a step function, a model may consider that all inputs and outputs occur simultaneously.

If a PSP model that includes rise times and decay is used, as is illustrated in FIG. 2B, then the arrival timing and ordering of input spikes may be more consequential. Still, even in this case, a single episode of PSP activations may correspond to that of a step-function PSP model in the case that the input neurons spike within a short time of stimulus arrival. That is, if the input spikes arrive within a time window that is short relative to the decay of the PSP, the network may reset before and after each episode of activity.

While the above description uses PSP functions to model spiking inputs, other forms of communication between neurons are also contemplated. For example, in some embodiments, a smoothed approximation using a tanh or sigmoid function may be used. In these cases, there may be no need for an explicit threshold, since the neurons may communicate their activation level to downstream neurons, rather than a binary output based on a threshold crossing.

According to Equation 1 and Equation 2, a neuron may receive positive and/or negative inputs based on positive synaptic weights. The synaptic weights may scale inputs from distinct excitatory and inhibitory units. That is, the scaling factor of each PSP (i.e. the weight) may be constrained to be positive, but the input neurons themselves may be either positive (excitatory) or negative (inhibitory). Other means for configuring a neural network to have positive and negative inputs to a neuron are also contemplated. In one example, the weights may have either positive or negative sign. That is, the weights may not be constrained to be positive. In a second example, a neuron may have two outputs, one which provides excitatory PSPs to downstream neurons and another that provides inhibitory PSPs to downstream neurons. That is, the neurons may not be constrained to be either positive or negative, but may have different effects on different downstream neurons. In a third example, the first two examples may be intermixed. That is, neurons may have positive and negative outputs, and the weights associated with their connections to downstream neurons may also be positive or negative (or zero).

In accordance with certain aspects of the present disclosure, a neuron model may include spiking or smoothed inputs that may be considered to arrive simultaneously. According to any of the above arrangements of weight and input unit type constraints, the neurons in a subsequent layer may be excited and/or inhibited by a pattern detected in a prior layer.

Network Overview

An embodiment of certain aspects of the present disclosure may be applied to classifying digits in visual data. One such embodiment may include four feedforward layers. As illustrated in FIG. 3. The range of occupied positions may narrow through progressive layers, with Layer 1 and Layer 2 neurons occupying X-positions in the range of positions 0-11 (corresponding to the width of the input images) and Layer 3 and Layer 4 neurons occupying X-positions in the narrower range of positions 2-9. In this example, the number of neurons per layer peaks in Layer 3.

According to certain aspects of the present disclosure, neurons may be topographically arranged, meaning that the position of every neuron may correspond to a location in an input space. For example, the position of every neuron may correspond to a pixel location if visual data is used as input to the neural network. In addition, according to certain aspects of the present disclosure, connections between neurons may be made based on this topography. For example, in some embodiments, whether or not a neuron in Layer 3 connects to (receives input from) a neuron in Layer 2 may be based in part on the position of the Layer 3 neuron in the topography and the position of the Layer 2 neuron in the topography. Additional examples of how connections between neurons may be based on topography are provided below.

The network may include a population code for certain neuron types. For example, a set of neurons of a particular type may be repeated over the whole topography. In this example, activation of a unit of the population may indicate the relevance of its responsivity at that position.

The responsivity properties of a neuron may be created by specific patterns of connections. Variations of these patterns may be repeated without regard to whether they are likely to be activated in the digits classification task. For example, patterns may be rotated. In one example, each non-degenerate rotation of a pattern by a certain angle (e.g. 30 degrees) may be repeated as a separate population of neurons. Most neurons in this example may never fire during the presentation of the ten digits of the digit classification task. However, some of the neurons that do not fire during the digit classification task may fire during other tasks. In this respect, a network that includes substantially all non-degenerate variations of patterns may be considered to have a general network pattern that may be applied to solve different problems.

Input Layer and Simple Features

Figure 4A:
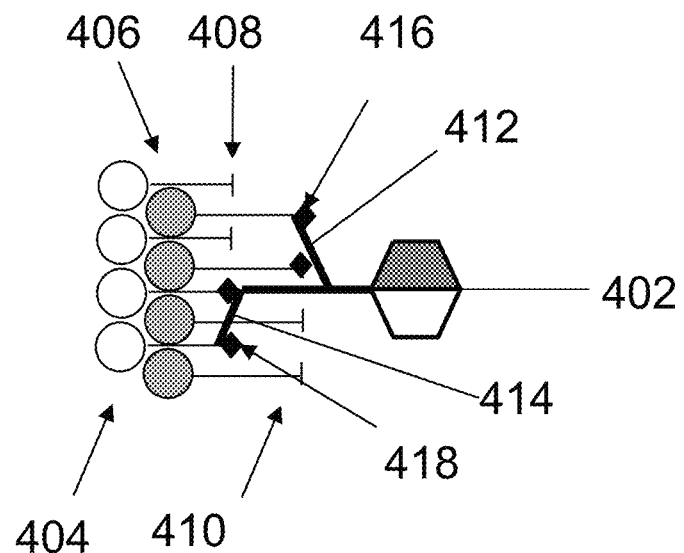
FIG. 4A illustrates a connection arrangement to form a one-dimensional edge detector in accordance with certain aspects of the present disclosure.
Figure 4B:
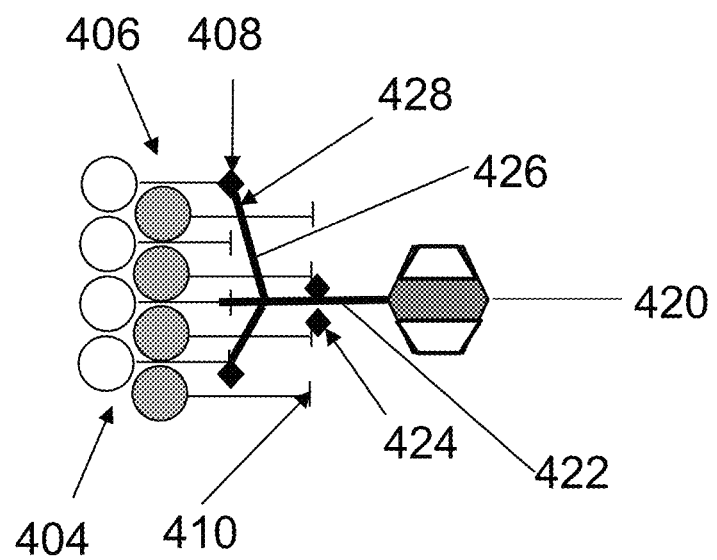
FIG. 4B illustrates a connection arrangement to form a one-dimensional line detector in accordance with certain aspects of the present disclosure.

FIGS. 4A-B illustrate how two different neurons may be configured to have different selectivities in accordance with certain aspects of the present disclosure. These two different neurons may be considered different types of Layer 2 neurons in a network configured to receive a one-dimensional input. In FIG. 4A and FIG. 4B, an input layer includes overlapping sets of excitatory units 406 and inhibitory units 404. Four units (neurons) of each input type are shown. While the excitatory units 406 and inhibitory units 404 are shown in staggered locations along the vertical axis, each pair of units may be considered to respond to the same position in the one-dimensional topography.

In one configuration, the outputs of the excitatory neuron units 406 may be real valued between 0 and 1. The value of the output may be in proportion to the inverted input intensity. If the input is an image, an inverted image intensity selectivity may correspond to high levels of activation for dark portions of the image and low values of activation for light portions of the image. The input layer also contains inhibitory units 404 with real valued outputs between 0 and −1, in inverse proportion to the inverted image intensity. If the input is an image, an inverse of an inverted image intensity corresponds to high levels of activation (a relatively large magnitude negative number) for light portions of the image and low values of activation (a relatively small magnitude negative number) for dark portions of the image.

For the two-dimensional image classification network described above, there may be a two-dimensional array of excitatory neurons and a second two-dimensional array of inhibitory neurons. Each array may be considered to occupy a plane in the topography. For the purpose of connectivity, the neurons from each plane may be considered to occupy the same Layer. In the example configuration described above, there may be one excitatory neuron corresponding to each pixel in the input image. In addition, there may be one inhibitory neuron corresponding to each pixel in the input image. These two neuron types are the two layer types in the input layer (Layer 1) of the example digit classification neural network, as illustrated in the first row of FIG. 3.

As described above, the neurons in the input layers may output real valued outputs between 0 and 1 (excitatory) or 0 and −1 (inhibitory). For the neurons in subsequent layers however, such as neuron 402 in FIG. 4A and neuron 420 in FIG. 4B, the outputs may be configured to be binary (0 or 1). The use of real-valued outputs for an input layer may be desirable for neuron layers that serve as sensory input neurons. Other means of sensory encoding are also contemplated. In one configuration, a sensory variable at one location may be encoded by a population of binary spiking neurons. For example, each neuron in the population may spike with a probability that is proportional to the value of the sensory variable. In an image processing task, each neuron in such a population could emit spikes with a probability that is proportional to image intensity. In this way, the expected number of spikes emitted by population of binary spiking neurons may closely match the value of sensory variable.

In the digit classification example, the second layer contains neurons that are selective (i.e. receptive) to oriented edges or lines. This layer, therefore, may be referred to as having selectivity for "Simple Features" as illustrated in FIG. 3. Selectivity for particular input patterns (such as edges or lines in visual data) may be considered a form of filtering. According to certain aspects of the present disclosure, the filtering function of neurons may result from configured connection patterns. In some embodiments, the filtering properties may be present without learning. In addition, in some embodiments, a filtering property of a neuron that results from the configuration of connections may be further modified by learning.

FIG. 4A illustrates one embodiment of a neuron configured to have an edge detection filtering behavior. In this example, neuron 402, by virtue of its connections to input layer neurons, will respond to an edge at a specific location in a one-dimensional topography. Given an input layer with excitatory 406 and inhibitory 404 neurons corresponding to each position, the inhibitory neuron axon terminals 408 lie in one plane and the excitatory axon terminals lie in another plane 410. The position of each axon terminal may be the same as the position of the corresponding neuron body. In this example, the neuron 402 has two dendrites, a first dendrite 412 that is oriented upward from the cell body 402, and a second dendrite 414 that is oriented downward from the cell body 414. The dendrites 412 and 414 extend through axon terminals 408 and 410 of the inhibitory 404 and excitatory 406 input neurons, respectively. The connectivity pattern of the first dendrite 412 and the second dendrite 414 are not the same. Rather, the first dendrite 412 makes connections (synapses), such as connection 416, with excitatory axon terminals in the upper region of the topography. In contrast, the second dendrite 414 makes connections (synapses), such as connection 418, with inhibitory axon terminals in the lower region of the topography. This configuration results in a selectivity for neuron 402 that is responsive to an edge in the input. Specifically, the neuron 402 may have a selectivity for an edge with a dark region above a light region at a particular location in the input topography corresponding to the position of the neuron 402 in the topography. Likewise, other neurons having the same connectivity pattern, but having different positions in the topography, may be selective for edges that appear in other regions of the topography.

FIG. 4B illustrates a second embodiment of a connectivity pattern in accordance with certain aspects of the present disclosure. In this example, the neuron 420 may respond to a spot of intensity that is bounded by regions of low input intensity above and below. As with the example illustrated in FIG. 4A, the example illustrated in FIG. 4B includes an input layer with excitatory 406 and inhibitory 404 neurons responding to each position in a one-dimensional topography. The excitatory neuron axon terminals 410 lie in one plane. The inhibitory axon terminals lie in a second plane 408. The neuron 420 has a central dendrite 422 that makes synapses 424 with the axon terminals of the proximate excitatory neurons. The neuron 420 also has two side dendrites, including an upper dendrite 426, that makes synapses 428 with the axon terminals 408 of the inhibitory neurons 404. This configuration results in a neuron that responds to a confined region of intensity in the input that is bounded by low intensity regions. This selectivity pattern may be referred to an "on-center" and "off-periphery".

While the connectivity patterns described with respect to FIG. 4A and FIG. 4B correspond to a one-dimensional topography, analogous connectivity patterns may be applied to a two-dimensional topography. For example, a connectivity pattern analogous to FIG. 4B may be configured so that a neuron may be selective for a line in a two-dimensional topography.

Figure 5:
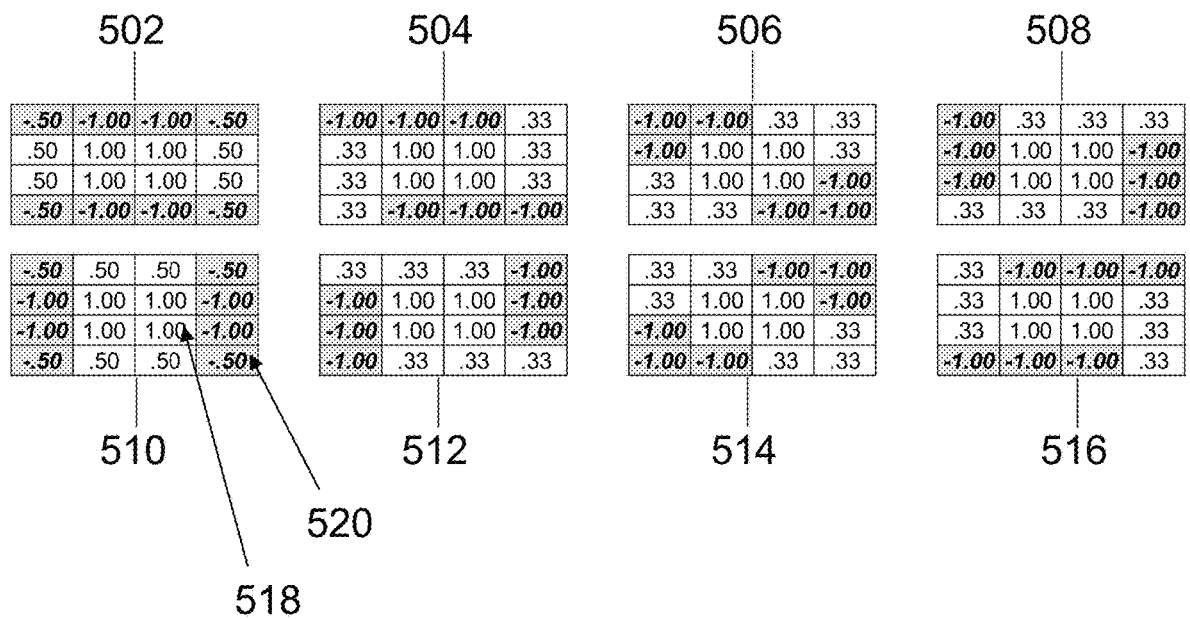
FIG. 5 illustrates weight templates in accordance with certain aspects of the present disclosure.

FIG. 5 illustrates examples of connection patterns for two-dimensional inputs, as used for Layer 2 neurons in the example digit classification network. The inputs at this stage correspond to the input intensity at each location in the topography. Accordingly, there is only a single connection made at each location to neurons in the second layer. The first layer in this example is arranged so that there is one excitatory and one inhibitory neuron at each location in the pixel topography. In Layer 2 and in subsequent layers, there may be multiple additional unit types defined at each position.

As illustrated in FIG. 5, connections may be configured with a weight template. In this example, each Layer 2 neuron may connect to inputs in a 4×4 pixel region of layer 1. Continuing with the general network architecture that may be applied to digit classification, Layer 2 is configured to have eight neurons types, with each neuron type defined by a weight template. For example, the weight template 510 has excitatory weights 518 in central positions and inhibitory weights 520 in peripheral positions on the left and right. The inputs from excitatory weights 518 are illustrated in regular text on a white background. The inputs from inhibitory neurons are illustrated with bold italic text on gray background. In each case, the sign of the text indicates the sign of the neuron making a connection to the neuron at the corresponding location in the topography. A positive sign indicates that the connection is with an excitatory neuron. A negative sign indicates that the connection is with an inhibitory neuron.

The connectivity patterns illustrated in FIG. 5 may be used to configure a neuron's selectivity for different two-dimensional patterns. These patterns may correspond to the one-dimensional example illustrated in FIG. 4B. In each case, a neuron is configured by its weight template to respond when the center has a high intensity and the periphery has low intensity. In a two-dimensional image this selectivity pattern may correspond to a line, and each template may correspond to a different orientation of this line pattern. Weight template 502 corresponds to a selectivity for a substantially horizontal line. Weight template 504 corresponds to a selectivity for a line that is tilted slightly upward with respect to horizontal. Weight template 506 corresponds to a selectivity for a line that is further tilted upward with respect to horizontal. Weight template 508 corresponds to a selectivity for a line that is tilted slightly rightward of vertical. Weight template 510 corresponds to a selectivity for a substantially vertical line. Weight template 512 corresponds to a selectivity for a line that is tilted slightly leftward of vertical. Weight template 514 corresponds to a selectivity for a line that is tilted further leftward from vertical. Weight template 516 corresponds to a selectivity for a line that is tilted still further leftward from vertical so that it is nearly horizontal. In the example network configuration, each location in layer 2 of the network may be configured with all eight arrangements. Each arrangement may be referred to as a neuron type.

In some embodiments, the weights may be configured with values that differ from the values illustrated in FIG. 5A. For example, the weight assigned to each connection may be modified by randomly choosing a value within a range of 80-100% of value shown in the template. In some embodiments, all of the weights for each neuron may be normalized to a total weight that is around 6× the threshold, 't', in Equation 2.

Complex Features

An embodiment of certain aspects of the present disclosure may include neurons that respond to combinations of features. Continuing with the digit classification example, Layer 3 neurons may respond to more complex features than the Layer 2 neurons just described. The selectivity of Layer 3 neurons may be configured to respond to combinations of the line segment features for which layer 2 neurons are selective. These combinations may yield selectivity for various curves and shapes, as described below.

In accordance with certain aspects of the present disclosure, each Layer 3 neuron may have a neuron body and one or more dendrites. The neuron body may have a position in the same topography as the Layer 2 neurons. Each dendrite may be a curve in the topography starting from the neuron body and extending into the topography. For example, the curve of a dendrite may be a straight line. In the example of a straight line, the dendrite may be defined by an orientation and a length. Other curves are also contemplated, including semi-circular curves, bended curves in multiple directions, zig-zag patterns, and the like. In these examples, the dendrite may be defined by a length and a plurality of orientations at different positions along the length.

Each dendrite of a neuron may extend into the topography where it may come into proximity of one or more axon terminals of the Layer 2 neurons. In the example digit classification network, the dendrites of Layer 3 neurons project outwards from the position of the neuron body in a straight line. In addition, the length of the dendrite may be configured so that the length of the dendrite extends to the location of the closest axon terminal of layer 2 neurons. As described above, in the example digit classification network, there may be axon terminals from each of eight Layer 2 neuron types at each pixel location in the visual data topography.

Each dendrite may connect to a subset of the available input neurons. Continuing with the digit classification example, there may be eight available Layer 2 neurons for each dendrite of a layer 3 neurons. The available Layer 2 neurons may have a range of selectivities. In this example, the available Layer 2 neurons will be selective for lines having one of the eight orientations described above.

According to certain aspects of the present disclosure, a processor coupled to a memory may determine which subset of available neurons a dendrite connects to based in part on the orientation of the dendrite at that position. In the example network, the processor may determine for each dendrite of the Layer 3 neurons whether to connect to a Layer 2. This determination may be based on the orientation of the dendrite in the topography and the selectivities of the available neurons at the corresponding position in the topography.

Different connection rules may yield neurons having a selectivity for different complex features. Examples of different complex feature selectivities are provided in FIGS. 6A-C, 7A-C, 8A-B, 9A-B, and 10A-D. FIG. 11 summarizes the different types of complex feature detectors used for the aforementioned digit classification example.

FIGS. 6A-C illustrate a neuron configured to have a selectivity for a circle in accordance with certain aspects of the present disclosure. In this example, the oriented line detectors of layer 2 may be arranged in columns. As described above, for one location in the topography, there may be eight simple feature detectors in layer 2. Each of the eight neurons at the same location may be selective to a line at a different orientation. For a portion of a Layer 3 dendrite that is proximate to one of these locations, therefore, there may be eight available Layer 2 neurons/axon terminals with which it may connect. The collection of all eight available input neurons may be referred to as a column. In FIG. 6A, a column 612 is located below and to the left of the layer 3 neuron 602. For clarity, the column 612 is shown as being made up of six different line-detector neurons. In the example digit classification network, however, eight line-detector neurons were available at each position.

In FIG. 6A, the oriented line detectors are illustrated with shaded and unshaded regions corresponding to their pattern of excitatory and inhibitory connections. Filter arrangement 502, for example, may correspond to oriented line detector 614. Likewise, filter arrangement 504 may correspond to oriented line detector 616. Filter arrangement 506 may correspond to oriented line detector 618. Filter arrangement 510 may correspond to oriented line detector 620.

A neuron 602 that detects a complex feature is situated in the network in the same topography as the layer 2 neurons 604 which respond to a range of oriented lines as described above. The neuron 602 has several dendrites 606 that form synaptic connections 608 with Layer 2 feature-detecting neurons 604. In this example, each dendrite forms a connection with one or two of the available neurons in a proximate column. For example, the dendrite that extends downward and leftward from the cell body 602 forms a connection with a Layer 2 neuron that is selective to lines that point downward and rightward. The remaining dendrites likewise form connections with Layer 2 neurons that are selective to lines that point in a direction that is substantially perpendicular to the orientation of the dendrite at the location of the connection.

In FIG. 6B, the connections that satisfy the above "substantially perpendicular" rule are illustrated at approximately equal distances from the neuron body 602. As described above, each of the neurons in a column may be located at substantially the same position in the topography. The radial offset of neurons in a column shown in FIG. 6A was employed for clarity. By visualizing only the layer 2 neurons to which the cell 602 forms connections, it can be appreciated that the neuron 602 will be selective to the presence of a circular shape 610. That is, the neuron 602 will respond to a circular shape when presented in its receptive field.

The selectivity for a circular shape may be a consequence of configuring the connections of the neuron based on the orientation of the dendrite at the location of each column of available neurons. Specifically, the connections 608 may be configured so that connections are formed with oriented line detectors whose preferred orientation is within a range of orientations close to perpendicular to the dendrite orientation. As there may be no layer 2 line-detector neurons that have a precisely perpendicular orientation to the dendrite, it may be desirable to configure connections that are within a range of the precise perpendicular orientations.

Other embodiments are contemplated that may use other rules to determine whether to connect to one or more available neurons. For example, whether a neuron connects to another neuron may be based on identifying the preferred selectivity of the neuron that most closely matches the orientation perpendicular to the orientation of the dendrite. In another example, whether a neuron connects to another neuron may be based on the input neuron having a preferred selectivity within a predetermined range of the orientation of the dendrite at that location. In the latter example, a dendrite could make more than one connections at a given column. In addition, a probability of a dendrite making a connection could be based on the orientation of a dendrite and the selectivity of an input neuron. Alternatively, or in addition, a probability of a dendrite making a connection may depend on a distance between the dendrite's corresponding neuron body and a position having available neurons.

Continuing with the example of the digit classification network, the distance at which connections are made may be closer in the vertical direction of the topography and further in the horizontal direction in the topography. As a result, the response may be strongest to an ellipse, rather than a circle. While FIG. 6B illustrates an example of selectivity to a circle, the results of the digit classification network, described below, used neurons having an elliptical selectivity.

Other possibilities are contemplated for which different rules are employed to determine at what distance to make connections. In one example, a distance rule may specify a constant distance (to match a circle). In another example, a distance rule may depend on the orientation of the dendrite (to match a spiral). In still another example, the distance rule may specify regular spaced intervals (to match concentric circles).

FIG. 6C illustrates a pattern in visual data corresponding to the selectivity of a complex feature detecting neuron as configured in the aforementioned digit classification network. The values illustrated in FIG. 6C reflect a linear superposition of the weights of the Layer 2 neurons that form connections with complex feature detecting neuron. The sign of the weights in FIG. 6C corresponds to whether the superposition of weights affecting layer 2 neurons from the corresponding position is predominantly excitatory (positive) or inhibitory (negative).

The illustration in FIG. 6C is not the same as the weight templates illustrated in FIG. 5. In FIG. 5, the excitation of each Layer 2 neuron is the linear sum of the output of the Layer 1 neurons scaled according to the values of weight template. The excitation of the Layer 3 neuron illustrated in FIG. 6C, however, is not the linear sum of the activations of Layer 2 neurons scaled by weights. Rather, the input to the Layer 3 neuron corresponds to the output of the Layer 2 neurons, which may be binary according to a non-linear step function. The linear superposition of the weights of the Layer 2 neurons that form connections to the Layer 3 neuron, therefore, may reflect the general selectivity of the neuron, even though in any particular image presentation, some of the Layer 2 neurons may not emit a spike and may thus not contribute to the activation level of the Layer 3 neuron.

Figure 6D:
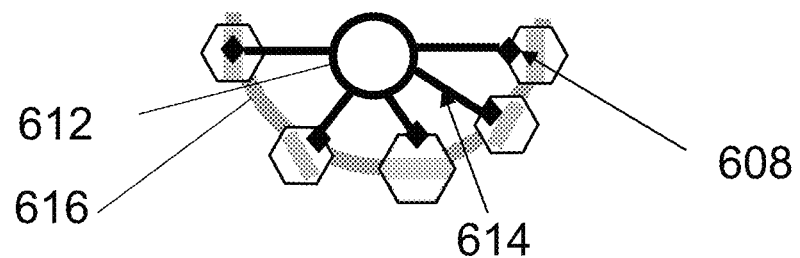
FIG. 6D illustrates a neuron that is responsive to the presence of a semi-circular path in its receptive field in accordance with certain aspects of the present disclosure.

FIG. 6D illustrates a related embodiment of certain aspects of the present disclosure that is also used in the example digit classification network. In this example, a complex feature detector neuron in Layer 3 may form connections with line detectors from Layer 2 so that the Layer 3 neuron may be selective to half-ellipses. This example neuron has a set of dendrites 614 that span 180° around the neuron body 612. These dendrites 614 have synapse connections 608 that are made with oriented line detectors whose preferred orientation is approximately perpendicular to the dendrite direction as in FIG. 6A and FIG. 6B. As a result of the connectivity rule and the relatively limited span of dendrites, the neuron 612 responds to the presentation of a half circle 616 in its receptive field. The arc to which the neuron is selective is in substantially the same position in the topography as the set of dendrites 614 and the open side of the half ellipse is opposite the position of the dendrites in the topography.

Figure 6E:
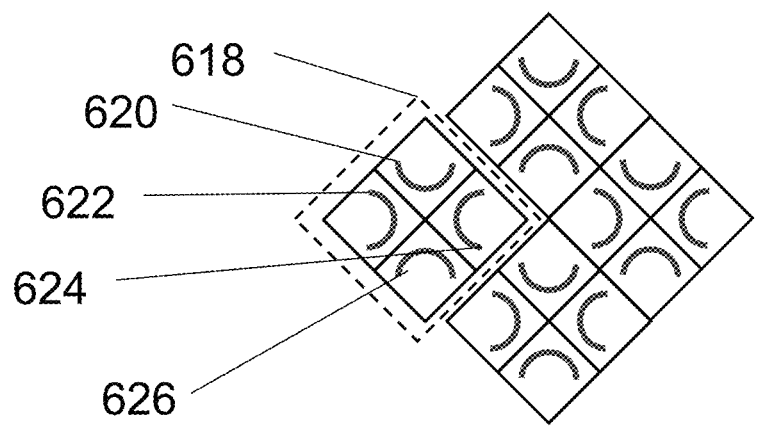
FIG. 6E illustrates a population of neurons that are responsive to the presence of a semi-circular path in accordance with certain aspects of the present disclosure

As with the line detectors of Layer 2 neurons described above, the complex feature detectors configured for the digit recognition example may also be characterized as having an orientation. For half-ellipse detecting neurons, the open side of the half-ellipse to which different neurons are selective may point in different directions in the topography. In one example, a column of half circle detectors 618 may contain a set of oriented half circle detectors that all respond to a half-ellipse at a single position in the topography, but with each unit responding to a different orientation of half ellipse. One unit 620 of a column in FIG. 6E may respond to a half ellipse oriented in the same direction as the neuron 612 illustrated in FIG. 6D. A second unit 622 may respond to a half ellipse oriented at a 90° clockwise rotation relative to orientation to which the neuron 612 is selective. A third unit 626 may respond to a half ellipse oriented at 180° relative to the orientation at which neuron 612 is selective. A fourth unit 624 may respond to a half ellipse presented at 270° relative to the orientation to which neuron 612 is selective. As illustrated in FIG. 6E, such columns may be repeated over the topography in a similar manner as the oriented line detectors of the Simple Feature layer (Layer 2) illustrated in FIG. 6A.

As summarized in FIG. 11, two different types of semi-circle detecting neurons are used in the digit classification network example, with each type having a selectivity for a different size of semi-circle. In addition, neurons selective or sensitive to each size are included a variety of rotations and positions. Other embodiments of the present disclosure may include neurons that connect to line segment selective neurons spanning all or part of a circular, elliptical, ovoid or other curved path at any orientation in the topography. As shown in FIG. 11, not all of the variations (e.g. rotations) of complex feature detector neurons may actually fire in the context of the digits classification example. Still, the feature detectors may be deployed in a uniform way as shown so that the network will may achieve a desired level of performance on a variety of classification problems.

FIGS. 7A-C illustrate another embodiment of certain aspects of the present disclosure that is applied in the digits classification example. In this embodiment, a neuron 702 is positioned in a topography proximate to Layer 2 neurons 704 that respond to a range of oriented lines as described above. The oriented line detectors may be arranged in columns, such as the column 612 illustrated in FIG. 6A. The neuron 702 has two dendrites 706 that prefer to form synaptic connections 708 with Layer 2 feature detecting neurons 704 that are selective to lines having a substantially similar orientation to the dendrite's own orientation. This connectivity rule contrasts with the rule described in reference to FIGS. 6A-E in which the dendrites made connections to feature detecting neurons having a substantially perpendicular orientation to the dendrite's own orientation. In FIG. 7A, connections begin adjacent to the neuron's location and continue along the length of the dendrites to the edge of the neuron's receptive field. According to this configuration of connections, the neuron 702 will respond to the presence of a corner shape 710, as illustrated in FIG. 7B, when presented in its receptive field.

The connections in this example are formed with oriented line detectors having preferred orientations within a range around the dendrite orientation. FIG. 7C illustrates the linear superposition of the weights of the Layer 2 neurons the connect to the neuron 702. The linear superposition therefore corresponds to the selectivity of the Layer 3 neuron 702.

As shown in FIG. 11, other related neuron types used in the aforementioned digit classification example include those connecting line detectors to make complex features that respond to corners at a variety of angles, namely: 45 degrees, 70 degrees, 90 degrees, and 135 degrees. Another related embodiment listed in FIG. 11 connects line detectors with two dendrites at a 180 angle (parallel and on opposite sides of the neuron) to detect a long line. Another related embodiment may use 3 or 4 dendrites to connect intersections of more than two lines at a point in the topography. As shown in FIG. 11, the digits classification example uses 3 and 4 line intersections at right angles. As in the case of the half-ellipse feature detectors illustrated in FIG. 6D and FIG. 6E, the complex feature detectors described with reference to FIGS. 7A-C may also be characterized as having an orientation. Likewise, columns corresponding to the same position and containing different orientations of the complex feature may be arranged at each point in the topography. The number of orientations included in the aforementioned digits classification network is shown in FIG. 11.

Figure 8A:
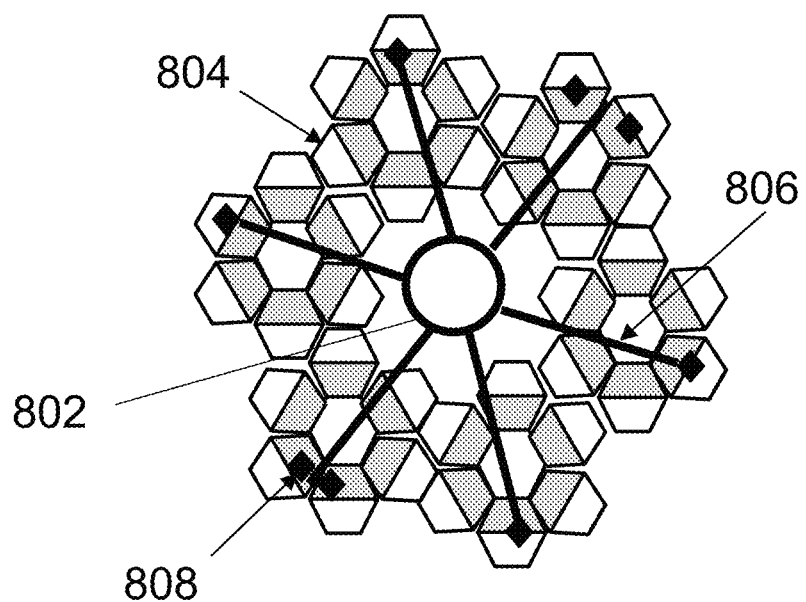
FIG. 8A illustrates a neuron with star-shaped dendrites having connections to edge detector neurons that are responsive to oriented edges substantially perpendicular to the dendrite orientation in accordance with certain aspects of the present disclosure.
Figure 8B:
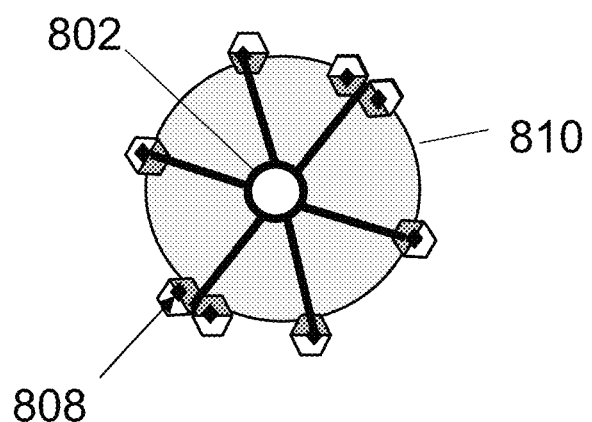
FIG. 8B illustrates a neuron that is responsive to the presence of an enclosed circle in its receptive field in accordance with certain aspects of the present disclosure.

FIGS. 8A-B illustrate another embodiment of certain aspects of the present disclosure. This embodiment was not included in the aforementioned digit classification example but may be useful in other visual classification problems. In this example, a neuron 802 is situated in the topography near to layer 2 neurons 804. The layer 2 neurons 804 respond to a range of oriented edges (as illustrated for one-dimensional inputs with reference to FIG. 4A). The oriented edges are arranged in columns. The neuron 802 has several dendrites 806 that prefer to form synaptic connections 808 with feature detecting neurons 804 that detect (i.e. are selective to) edges at a perpendicular orientation to the dendrite's own orientation at that position in the topography. In this example, the connections are made at a short distance from the neuron 802 in all directions around the neuron body 802. As a result of this pattern of connectivity, the neuron 802 will respond to the presence of a solid circular shape 810, as illustrated in FIG. 8B, when the solid circular shape 810 is presented in the receptive field of the neuron 802. Other embodiments of certain aspects of the present disclosure may be configured to be selective to a variety of contiguous solid shapes. The network arranged for the digit classification example has no edge detectors like the one shown in FIG. 8. Instead, the digit classification example includes line feature detectors that are connected to line (rather than edge) selective neurons.

Figure 9A:
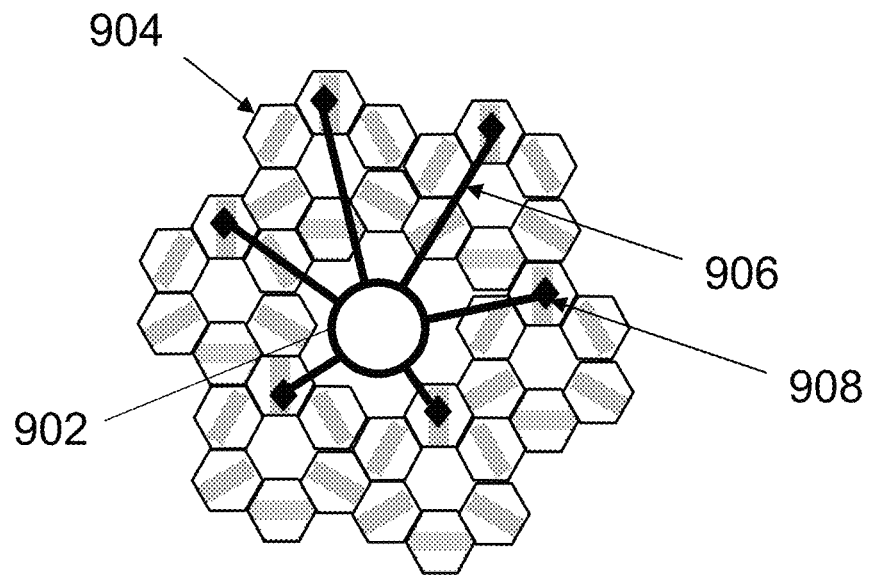
FIG. 9A illustrates a neuron having connections to line-detector neurons in accordance with certain aspects of the present disclosure.
Figure 9B:
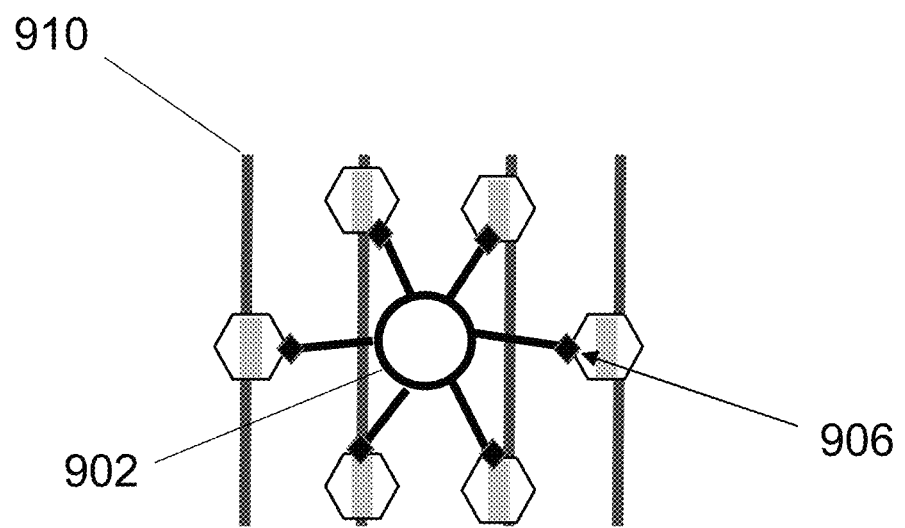
FIG. 9B illustrates a neuron that is responsive to texture features in accordance with certain aspects of the present disclosure.

FIGS. 9A-B illustrates another embodiment of certain aspects of the present disclosure. As with the example shown in FIGS. 8A-B, the neuron type illustrated in FIGS. 9A-B was not included in the aforementioned digit classification example, but may be useful in other visual classification problems. A neuron 902 is situated in the topography near to Layer 2 neurons 904 which respond to a range of oriented lines as described above. The oriented line detectors may be arranged in columns, such as the column 612 as illustrated in FIG. 6A. The neuron 902 has several dendrites 906 that prefer to form synaptic connections 908 with feature detecting neurons that detect lines at a constant orientation, regardless of dendrite orientation. That is, the determination to connect neuron 902 to neurons in the previous layer 904 may not be based on the orientation of the dendrite, but instead may be based only on the preferred selectivity of the putative input neurons. In this example, the synapse connections are made at regularly spaced distances along each of the dendrites. As a result of this connection pattern, the neuron 902 may respond to a texture that includes vertical lines 910. Other embodiments of certain aspects of the present disclosure may likewise respond to other textures. Examples may include neurons configured to be selective to patches of repeating patterns of multiple lines. The network created for the digit classification problem has no edge detectors like the one shown in FIGS. 9A-B.

Auditory Features

Figure 10A:
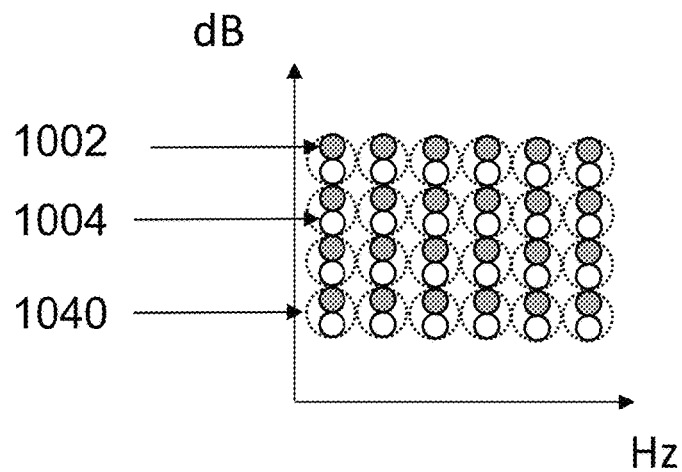
FIG. 10A illustrates neurons arranged in a topography for auditory processing in accordance with certain aspects of the present disclosure.

While the previous figures refer to an application to visual recognition, certain aspects of the present disclosure may be applied to non-visual data modalities, including other sensory modalities. FIGS. 10A-D illustrate an embodiment of certain aspects of the present disclosure that may be applied to audio processing. In FIG. 10A, a topography of auditory inputs may be defined over a range of frequencies measured in Hertz (Hz) and sound magnitudes measured in decibels (dB). A collection of inhibitory neurons 1002 may be arranged in the topography. Likewise, a collection of excitatory neurons 1004 may be arranged in the topography. Like the excitatory and inhibitory neurons in the visual example, an instance of both an excitatory neuron 1002 and an inhibitory neuron 1004 may be arranged at each position 1040 in the topography of sound frequency and intensity. Other embodiments are also contemplated in which the inhibitory and excitatory neurons may occupy non-overlapping regions of the auditory space topography.

Figure 10B:
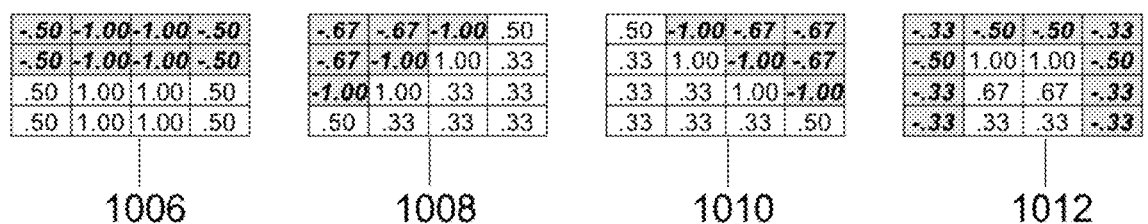
FIG. 10B illustrates example auditory receptive fields in accordance with certain aspects of the present disclosure.

In FIG. 10B, four filter arrangements are illustrated. A first filter arrangement 1006 responds when intensity is constant across a short range for frequencies. A second filter arrangement 1008 responds when intensity increases across a range of frequencies. A third filter arrangement 1010 responds when intensity decreases across a range of frequencies. A fourth filter arrangement 1012 responds to only a narrow band of frequencies at a substantially constant intensity. These filter arrangements may be considered detectors of certain patterns of frequency and intensity in the auditory inputs. In the context of a neural network embodiment, the filter arrangements may be considered input neurons having a preferred selectivity.

Figures 10C, 10D:
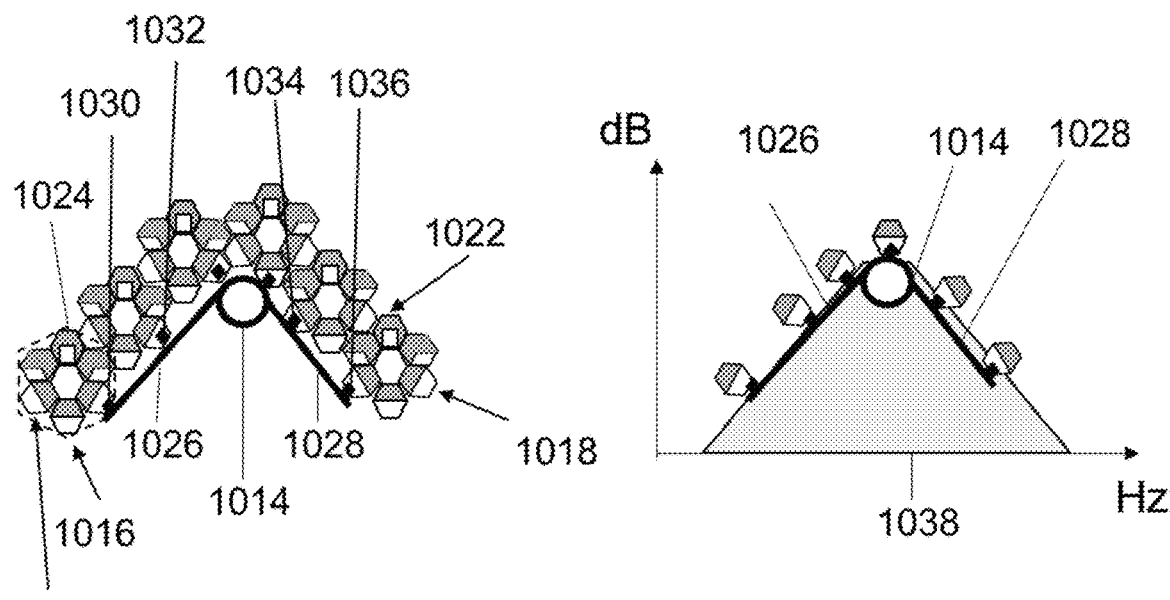
FIG. 10C illustrates a neuron having connections to auditory edge detector neurons in accordance with certain aspects of the present disclosure.
FIG. 10D illustrates a neuron that is responsive to an auditory pattern in accordance with certain aspects of the present disclosure.

FIG. 10C illustrates frequency/intensity input neurons that are tiled across a broad range of frequencies and intensities in a columnar structure. A neuron 1014 is in a layer of neurons receiving output from the frequency/intensity input neurons. In FIG. 10C, the frequency/intensity neurons are illustrated with shaded and unshaded regions corresponding to their pattern of excitatory and inhibitory connections, respectively. Filter arrangement 1006, for example, may correspond to frequency/intensity neuron 1016. Likewise, filter arrangement 1008 may correspond to frequency/intensity filter 1018. Filter arrangement 1010, for example, may correspond to frequency/intensity filter 1020. Filter arrangement 1012, for example, may correspond to frequency/intensity filter 1022.

As with the visual classification example, the filter/intensity filters (neurons) may be arranged in columns. The example illustrated in FIG. 10C includes six columns. The bottom left column 1020 corresponds to different filter arrangements in a low frequency and low intensity region of the topography.

The neuron 1014 has a first dendrite 1026 and a second dendrite 1028 to which outputs from the frequency/intensity filters (neurons) may connect (form synapses), and thus affect the activation level of the neuron 1014. In this example, the dendrite 1026 oriented in the direction of lower frequency and lower intensity from the neuron body 1014 connects to filters 1030 and 1032 that have a preferred selectivity for lower intensity and lower frequency within the range of frequencies and intensities covered by the topography. Likewise, dendrite 1028 oriented in the direction of higher frequency and lower intensity connects to filters 1034 and 1036 that detect lower intensity at higher frequencies within the range of frequencies and intensities covered by the topography.

FIG. 10D illustrates neuron 1014 superimposed over an auditory stimulus 1038 for which the neuron 1014 may respond strongly. In this example, the auditory stimulus 1038 includes a broad range of frequencies. The intensity is low at low frequencies, the increases with increasing frequency, peaks, and then decreases with increasing frequency.

Output Layer

Continuing with the example of a digit classification network, an output layer may include neurons that receive inputs from Layer 3 neurons. Layer 3 neurons include all of the neuron types described above in reference to FIGS. 6A-E, 7A-B, and 11. In addition, in the digit classification network, Layer 3 contains inhibitory versions of all these neuron types. Both the excitatory and inhibitory version of a neuron may be configured from the same dendrite pattern, but with connections to inputs that have an opposite valence.

As with the excitatory versions described above, the synaptic connection weights may be configured to be within 80%-100% of the base value according to a random modification. The total weight of synapses leading to a neuron may then be normalized. For Layer 3 neurons, the weights may be normalized to a value between 1.5× and 3× the neuron threshold. The total synaptic weight may be determined so that the neuron responds consistently to the presentation of inputs that trigger its preferred selectivity in the presence of noise in the input. As illustrated in FIG. 1, each input image was presented to the network with added random noise.

When taking into consideration the inhibitory version of each neuron type, Layer 3 of the digit classification network may include a total of around 4,000 neurons.

FIG. 12 illustrates how an output layer (Layer 4) may include a regular distribution of neurons based on the density of Layer 3 neurons. Each output neuron takes all the excitatory input from a 2×2 pixel area 1202, 1×2 pixel area 1204 or 1×1 pixel area 1206. Furthermore, FIG. 12 shows the density of Layer 3 neurons at each position. For example, there are 18 Layer 3 neurons at position 1208, which corresponds to (X=8,Y=13) in the pixel topography. Layer 3 neurons are much denser in the central area. To offset the density in the central area, Layer 4 neurons in the central area have the smallest receptive fields, while Layer 4 neurons on the periphery have larger receptive fields.

The Layer 4 neurons are similar to Layer 2 neurons in that they receive both excitatory and inhibitory inputs and have a high normalized synaptic weight compared to the normalized synaptic weight of Layer 3 neurons, which only receive excitatory inputs. Unlike Layer 2 neurons, however, the Layer 4 neurons are initialized to connect to excitatory and inhibitory inputs within their receptive field in an initially random pattern.

For the example digit classification network, the pattern of connections for Layer 4 neurons are configured according to the following method. First, receptive fields are determined based on the density of layer 3 neurons. As the receptive field corresponds to the length of the dendrite, this first step may also be considered determining a length of Layer 4 neuron dendrites based on the density of Layer 3 neurons proximate to the Layer 4 neurons in the topography. Second, the Layer 4 neurons connect to all of the available neurons that are proximate to their dendrites. The connections are initialized with synaptic weights that are randomly set to +/−20% of a base value. Third, the weights are normalized so that the magnitude of the excitatory weights are three times the magnitude of the inhibitory weights and so that the total weight is five times the threshold, t.

For a multi-class classification task, such as the digit classification task, this connectivity method may be repeated for each category. Since there are ten digits, this process may be repeated ten times, once for each of the digits between 0 and 9. Accordingly, each output category may be configured with its own complete set of connections over Layer 3. Since the weights to the Layer 3 neurons are initially chosen at random, the weights may then be adjusted by the learning algorithm. The classification given by the network may be determined by selecting the output group that has the highest firing rate in response to the input.

The learning rule may also apply to bias units. As described above, the threshold for each neuron may be configured with a constant value. Still, each neuron may also receive excitatory and inhibitory bias inputs that may be adjusted according with learning. The bias neurons may be neurons that fire in response to any input, regardless of what input is presented to the network. The excitatory and inhibitory bias neurons may be initialized with equal weights so they may have substantially no effect prior to training. The associated weights may then be adjusted as part of the network training. Alternatively, or in addition, the neurons may be configured so that the threshold of each neuron is an adjustable parameter. It may be desirable to configure neurons with fixed thresholds, however, as this may facilitate comparisons with biologically plausible learning mechanisms. In the example digit classification network, bias units are only applied to the output layer neurons. Furthermore, in the example network, the interior layers are untrained. Other configurations are also contemplated. For example, network configurations in which bias neurons are also used for interior layers is also contemplated.

Training Algorithm

In accordance with certain aspects of the present disclosure, a training algorithm may be applied to modify weights leading to output layer neurons. In one example, a learning rule may apply a global supervision signal in combination with local information at each synapse. This example may be considered similar to the Perceptron learning algorithm. The learning rule may be applied to each group of neurons corresponding to an output category separately. That is, each group of neurons may be trained on a one-against all classification of their preferred target. Given a learning rate parameter l and a number n of targets, the algorithm applied to each group after each example presentation may include the following steps: First, if the example is the target, the training signal is l. If, instead, the example is a non-target, the training signal is given as:

$$-\frac{l}{n-1}.$$

Second, for each synaptic weight, the weight update is determined based on the training signal multiplied by the input value on the synapse. That is: $w \rightarrow w+ir$.

The scaling of the training signal is uneven for target and non-target presentations because the non-target presentations are naturally more numerous by a ratio of (n−1) to 1. This scaling factor difference, however, may be considered an optional design choice. In addition, learning may be applied to interior layers. However, the results in the next section are based upon simulations in which the learning rule was only applied to output layer neurons.

Test Results

Test results are presented before and after training. Test results from a neural network prior to training may be referred to as untrained performance.

Figure 13:
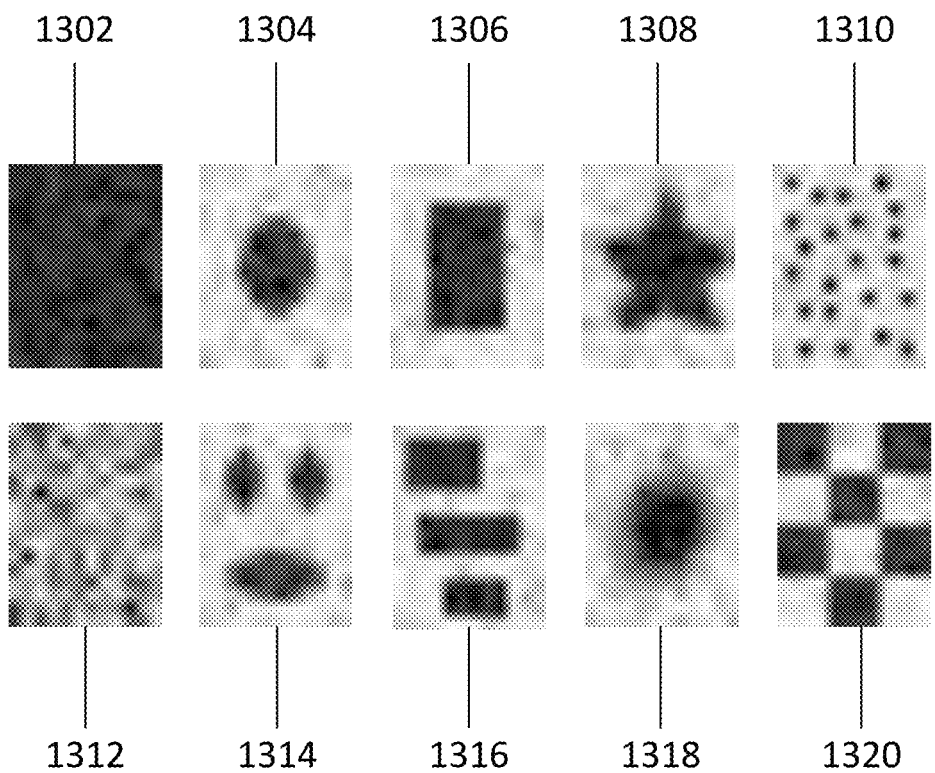
FIG. 13 illustrates non-digit distractors in accordance with certain aspects of the present disclosure.

Before training, the model output was compared on the set of target digits in comparison to a set of non-digit distractors. The distractors are shown in FIG. 13. The distractors include a dark image with noise 1302, a solid circle 1304, a solid rectangle 1306, a solid star 1308, a scattering of small boxes 1310, white noise 1312, a group of ellipses arranged as a face 1314, a group of rectangles 1316, a diffuse circle 1318, and a checkerboard pattern 1320. Each distractor is presented with additive noise, the same as for the target digits shown in FIG. 1.

The number of output neurons firing in response to each digit and non-digit is shown in FIG. 14. The digits are listed by the digit number itself, while the distractors are listed by reference number in FIG. 13. Alongside each digit and distractor is the average number of output layer neurons that responded to a presentation of that image in each output group. Since there were 68 output neurons per group, the maximum value in this test is 68. As can be appreciated with reference to FIG. 14, the network prefers the digits to non-digits in every case. That is, every digit has a firing rate higher than every non-digit. Overall, the network achieves what could be described as perfect classification of on this digit vs. distractor test.

Figure 15:
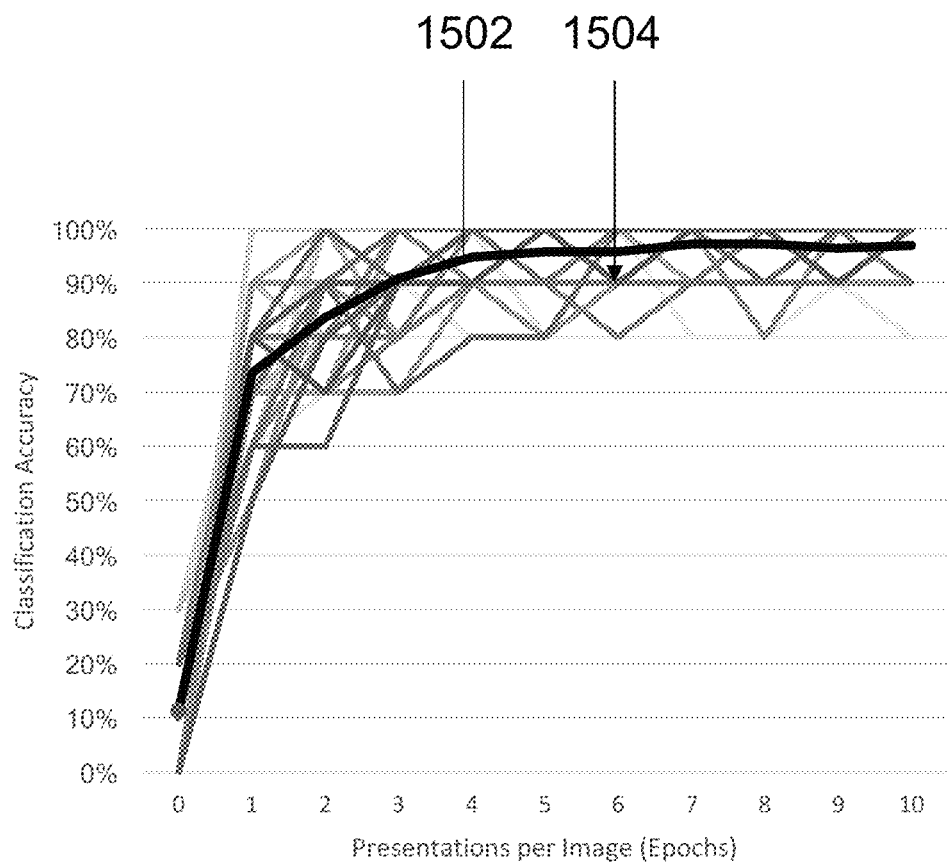
FIG. 15 illustrates example accuracy results as a neural network is trained in accordance with certain aspects of the present disclosure

FIG. 15 illustrates how the network performance for digit classification improves after each epoch of training. An epoch may refer to the presentation of each target image once. The target images may be presented in a random order. The average accuracy 1502 is shown with a thick black line, while the progress of several example training runs 1504 are shown in thin gray lines. Although the network has an initial preference of digits over non-digit inputs, the untrained network has no preference for any particular digit. Before training, network performance on the digit classification task (as opposed to the digit vs. distractor task) is completely random. The average accuracy is 10% on average, prior to training as illustrated in FIG. 15. This level of performance is expected for a classification task involving 10 categories.

As described above, the output category may be determined as the group with the highest firing rate (out of 68 output neurons in each group). While all networks achieve perfect accuracy at some point in their training, the noise in the sample perturbs some trained networks and the highest overall (average) accuracy achieved at any point is 98%. This level of accuracy is achieved after around 7 or 8 presentations of each image. As shown in FIG. 15, some networks may achieve a high classification rate after just one or two presentations of each image.

The high level of accuracy in a short training time may reflect the utility of certain aspects of the present disclosure. In particular, by configuring neurons with specific patterns of connectivity, the configured structures may obviate most learning in the network. In the example object classification network, only the output layer had to be trained. The response properties of the interior neurons had apparently already transformed the inputs well enough so that weight modifications on the output later alone could yield satisfactory performance.

In addition, even with no training, the preconfigured patterns of connectivity were shown to be capable of distinguishing digits from non-digit distractors.

Furthermore, in comparison to some current machine learning techniques, the pre-configuration of connection patterns may result in a more sparse connectivity for the network as a whole, which in turn may be amenable to desirable computational properties of sparse matrices.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A system for configuring an artificial neural network, comprising:
   a memory; and
   a processor coupled to the memory, wherein the processor is configured to:
   arrange a first plurality of neurons in a topography, wherein a selectivity of a first neuron of the first plurality is based at least in part on a position of the first neuron in the topography;
   arrange a second plurality of neurons in the topography; wherein a second neuron of the plurality of neurons includes a body and a dendrite, the body having a position in the topography and the dendrite extending from the body and having an orientation in the topography, wherein a number of neurons in the second plurality of neurons is based on a number of non-degenerate variations of a connectivity pattern, wherein a variation of the connectivity pattern is rotated from a second variation of the connectivity pattern by a predetermined angle; and
   connect the first neuron to the second neuron, so that an output of the first neuron is an input to the second neuron, based at least in part on:
   the position of the first neuron;
   the orientation of the dendrite at the position of the first neuron; and
   the selectivity of the first neuron.

2. The system of claim 1, wherein the processor is configured to connect the first neuron to the second neuron further based on: the position of the body of the second neuron.

3. The system of claim 1, wherein a number of connections to the second neuron is based on a predetermined range around a target number of connections for the second plurality of neurons.

4. The system of claim 1, wherein the processor is configured to connect the first neuron to the second neuron further based on: a density of available neurons at the position of the first neuron.

5. The system of claim 1, wherein a length of the dendrite depends on a density of neurons in the first plurality of neurons at positions proximate to the position of the body of the second neuron.

6. The system of claim 1, wherein the processor is further configured to connect a dendrite of a downstream neuron to one or more neurons of the second plurality based at least in part on:
   a preferred connectivity pattern; and
   the predetermined angle between non-degenerate variations of the connectivity pattern.

7. The system of claim 1, wherein the processor is further configured to:
   arrange a third plurality of neurons in the topography, wherein each connection from neurons of the third plurality to the second neuron has a negative valence, and wherein each connection between neurons in the first plurality and the second neuron has a positive valence.

8. The system of claim 1, wherein the processor is further configured to:
   receive visual data; and
   classify the visual data based on a neural network, wherein the neural network comprises the first plurality of neurons and the second plurality of neurons.

9. The system of claim 1, wherein the processor is further configured to:
   receive auditory data; and
   classify the auditory data based on a neural network, wherein the neural network comprises the first plurality of neurons and the second plurality of neurons.

10. A non-transitory computer readable medium having instructions stored thereon that, upon execution by a computing device, cause the computing device to perform operations comprising:
    arranging a first plurality of neurons in a topography, wherein a selectivity of a first neuron of the first plurality is based at least in part on a position of the first neuron in the topography;
    arranging a second plurality of neurons in the topography; wherein a second neuron of the plurality of neurons includes a body and a dendrite, the body having a position in the topography and the dendrite extending from the body and having an orientation in the topography;
    connecting the first neuron to the second neuron, so that an output of the first neuron is an input to the second neuron, based at least in part on:
    the position of the first neuron;
    the orientation of the dendrite at the position of the first neuron; and
    the selectivity of the first neuron; and
    arrange a third plurality of neurons in the topography, wherein each connection from neurons of the third plurality to the second neuron has a negative valence, and wherein each connection between neurons in the first plurality and the second neuron has a positive valence.

11. The non-transitory computer readable medium of claim 10, wherein connecting the first neuron to the second neuron is further based on: the position of the body of the second neuron.

12. The non-transitory computer readable medium of claim 10, wherein a number of connections to the second neuron is based on a predetermined range around a target number of connections for the second plurality of neurons.

13. The non-transitory computer readable medium of claim 10, wherein connecting the first neuron to the second neuron is further based on: a density of available neurons at the position of the first neuron.

14. The non-transitory computer readable medium of claim 10, wherein a length of the dendrite depends on a density of neurons in the first plurality of neurons at positions proximate to the position of the body of the second neuron.

15. The non-transitory computer readable medium of claim 10, wherein a number of neurons in the second plurality of neurons is based on a number of non-degenerate variations of a connectivity pattern, wherein a variation of the connectivity pattern is rotated from a second variation of the connectivity pattern by a predetermined angle.

16. The non-transitory computer readable medium of claim 15,
    having instructions stored thereon that, upon execution by a computing device, cause the computing device to perform operations further comprising:
    connecting a dendrite of a downstream neuron to one or more neurons of the second plurality based at least in part on:
    a preferred connectivity pattern; and
    the predetermined angle between non-degenerate variations of the connectivity pattern.

17. The non-transitory computer readable medium of claim 10, having instructions stored thereon that, upon execution by the computing device, cause the computing device to perform operations further comprising:

receiving visual data; and classifying the visual data based on a neural network, wherein the neural network comprises the first plurality of neurons and the second plurality of neurons.

18. A method of configuring an artificial neural network, comprising:

arranging a first plurality of neurons in a topography, wherein a selectivity of a first neuron of the first plurality is based at least in part on a position of the first neuron in the topography;

arranging a second plurality of neurons in the topography; wherein a second neuron of the plurality of neurons includes a body and a dendrite, the body having a position in the topography and the dendrite extending from the body and having an orientation in the topography; and connecting the first neuron to the second neuron, wherein a number of connections to the second neuron is based on a predetermined range around a target number of connections for the second plurality of neurons, so that an output of the first neuron is an input to the second neuron, based at least in part on:

the position of the first neuron;

the orientation of the dendrite at the position of the first neuron; and the selectivity of the first neuron.

19. The method of claim 18, wherein connecting the first neuron to the second neuron is further based on: the position of the body of the second neuron.

20. The method of claim 18, wherein a number of neurons in the second plurality of neurons is based on a number of non-degenerate variations of a connectivity pattern, wherein a variation of the connectivity pattern is rotated from a second variation of the connectivity pattern by a predetermined angle.

* * * * *